US012221332B2

(12) United States Patent
Cantrill

(10) Patent No.: US 12,221,332 B2
(45) Date of Patent: Feb. 11, 2025

(54) APPARATUS FOR OPERATING THE FORK HOLDER SUPPORTS OF A FORKLIFT

(71) Applicant: E80 Group S.p.A., Viano (IT)

(72) Inventor: Peter Wade Cantrill, Viano (IT)

(73) Assignee: E80 GROUP S.P.A., Viano (IT)

( * ) Notice: Subject to any disclaimer, the term of this patent is extended or adjusted under 35 U.S.C. 154(b) by 0 days.

(21) Appl. No.: 17/768,406

(22) PCT Filed: Oct. 15, 2020

(86) PCT No.: PCT/IB2020/059696
§ 371 (c)(1),
(2) Date: Apr. 12, 2022

(87) PCT Pub. No.: WO2021/074839
PCT Pub. Date: Apr. 22, 2021

(65) Prior Publication Data

US 2024/0124284 A1 Apr. 18, 2024

(30) Foreign Application Priority Data

Oct. 15, 2019 (IT) ........................ 102019000018926

(51) Int. Cl.
*B66F 9/16* (2006.01)
*B66F 9/08* (2006.01)
*B66F 9/14* (2006.01)

(52) U.S. Cl.
CPC ................ *B66F 9/16* (2013.01); *B66F 9/085* (2013.01); *B66F 9/143* (2013.01)

(58) Field of Classification Search
CPC ............. B66F 9/148; B66F 9/16; B66F 9/143
See application file for complete search history.

(56) References Cited

U.S. PATENT DOCUMENTS 3,726,427 A * 4/1973 Carlund .................... B66F 9/16 414/642
4,533,290 A * 8/1985 Hackauf ................. B66F 9/143 414/667

(Continued)

FOREIGN PATENT DOCUMENTS

GB 575 488 A 2/1946
JP S53 72386 U 6/1978
JP 3 740888 B2 2/2006

OTHER PUBLICATIONS

International Search Report for PCT/IB2020/059696 dated Jan. 22, 2021 (4 pages).

*Primary Examiner* — Mark C Hageman
(74) *Attorney, Agent, or Firm* — Tutunjian & Bitetto, P.C.

(57) ABSTRACT

An apparatus for operating the fork holder supports of forks of a manually or automatically driven forklift, including a first frame slidable within a vertical upright of said forklift. The first frame comprises connection means for a second frame, which supports the connection means, configured for allowing a rotation of the second frame with respect to the first frame, and first actuator means for rotating the second frame with respect to the first frame. The connection means include guiding means and sliding means, or a cam element, which allow a substantially vertical arrangement of the first actuator means within the apparatus; in addition, the first actuator means include at least one linear electric actuator of commercial type, or a trapezoidal screw actuator, or a worm screw actuator with recirculating ball nut.

11 Claims, 17 Drawing Sheets

(56) References Cited

U.S. PATENT DOCUMENTS

| | | | | | |
|---|---|---|---|---|---|
| 5,096,363 | A * | 3/1992 | Weinert | B66F 9/143 | |
| | | | | 414/667 | |
| 5,788,016 | A * | 8/1998 | Soulas | B66F 9/16 | |
| | | | | 187/238 | |
| 6,101,889 | A | 8/2000 | Laskey | | |
| 6,851,915 | B2 * | 2/2005 | Warner | B66F 9/122 | |
| | | | | 414/667 | |
| 10,640,349 | B2 * | 5/2020 | Prentice | B66F 9/146 | |
| 10,717,636 | B2 * | 7/2020 | Addicott | B66F 9/12 | |
| 11,591,198 | B2 * | 2/2023 | Dieringer | B66F 9/16 | |
| 12,006,197 | B1 * | 6/2024 | Hamlik | B66F 9/148 | |
| 2003/0156935 | A1 * | 8/2003 | Mondani | B66F 9/143 | |
| | | | | 414/667 | |
| 2013/0177374 | A1 * | 7/2013 | Matti | B66F 9/12 | |
| | | | | 414/667 | |
| 2022/0402739 | A1 * | 12/2022 | Schüßler | B66F 9/20 | |

* cited by examiner

APPARATUS FOR OPERATING THE FORK HOLDER SUPPORTS OF A FORKLIFT

TECHNICAL FIELD OF THE INVENTION

The present invention regards an apparatus for operating the fork holder supports of a manually or automatically driven forklift.

More particularly, the present invention regards an apparatus for operating the aforesaid supports, and consequently the forks of a forklift, by means of linear electric actuators of commercial type, according to different movements, particularly: tilt or swing, lateral translation and mutual distance between the forks.

STATE OF THE PRIOR ART

Generally, the forks of a manually or automatically driven forklift can be tilted backward in order to bring the load against the abutment side, the so-called backrest, so as to stabilize the load; in addition, the forks can be tilted forward in order to facilitate the deposit of the load on shelves or shelving, roller conveyors, etcetera.

Such movements—forward or backward—of the forks can be obtained by swinging or rotating the upright or the support equipment of the forks around a pin with horizontal axis arranged behind the same forks; the swing or the rotation of the upright or of the equipment serves in fact for tilting the load abutment plane, with consequent lowering or lifting of the tips of the forks.

In order to obtain the rotation of the equipment, it is necessary to provide for a suitable device provided with one or more actuators capable of developing a considerable force, of the same order as the weight of the load.

In the field of linear electric actuators of commercial type, for example similar to that of U.S. Pat. No. 6,101,889A, actuators with comparable forces are not available, or the aforesaid actuators have sizes and costs that render them unusable for such applications.

In the support equipment for the forks, other actuators can be provided for rendering the forks of the forklift laterally translatable, i.e. the load transported on the forks can be moved to the left and to the right; this characteristic is particularly useful when one operates in narrow settings and in order to position loads on the shelving without having to move the forklift itself.

In addition, in order to be adapted to loads with different forking distances, further actuators can be provided in order to render the forks of the forklift adjustable in their mutual distance; such further actuators move the supports of the forks in an assisted manner commanded by the operator, or by the control unit of the automatic drive vehicle. With the known solutions, there can be size problems for inserting all the actuators of the abovementioned type into the support equipment of the forks; with respect to the known solutions, it is also desirable—given the same load transported on the forks—to decrease the force required by actuators, in particular it is desirable to decrease the force required by the actuator that renders the forks tiltable forward or backward, both for size problems and for problems of power peaks required by the plant of the forklift for the actuation of the actuator itself.

SUMMARY OF THE INVENTION

One object of the present invention is that of improving the known apparatuses for operating the fork holder supports of a manually or automatically driven forklift.

Another object of the present invention is that of providing an apparatus for operating the fork holder supports that is optimized with regard to the sizes and the use of the available space.

Another object of the present invention is that of providing an apparatus as indicated above which requires less power for the actuation.

Another object of the present invention is that of providing an apparatus as indicated above which has simple structure and which is reliable.

Still another object of the present invention is that of providing an apparatus as indicated above which uses standardized components that can be easily substituted in case of need. In accordance with one aspect of the invention, a device is provided according to the present application. The apparatus, suitable for actuating the supports for the forks of a manually or automatically driven forklift, comprises a first frame, slidable within a vertical upright of the forklift.

The first frame comprises connection means for a second frame, which supports the aforesaid connection means, configured for allowing a rotation of the second frame with respect to the first frame, according to the desired tilt.

The apparatus also comprises first actuator means suitable for actuating, in rotation, the second frame with respect to the first frame.

According to the invention, the means for connecting the second frame to the first frame comprise guiding means and sliding means, or a cam element, configured for obtaining a substantially vertical arrangement of the first actuator means within the apparatus.

In addition, the first actuator means comprise at least one linear electric actuator of commercial type, whose use allows obtaining a solution that is optimized with regard to the use of the available space.

Alternatively, the aforesaid first actuator means can comprise a trapezoidal screw actuator, or a worm screw actuator with recirculating ball nut.

The particular and innovative configuration of the connection means, according to the invention, also allows obtaining a solution in which the force required by the first actuator means is less than that required in the solutions of known type.

The present application refers to preferred and advantageous embodiments of the invention.

BRIEF DESCRIPTION OF THE DRAWINGS

Other characteristics and advantages of the invention will be more evident from the description of a non-exclusive embodiment of an apparatus for operating the fork holder supports of a forklift, according to the present invention, given as a non-limiting example in the enclosed drawing tables in which.

DETAILED DESCRIPTION OF THE INVENTION

Figure 1:
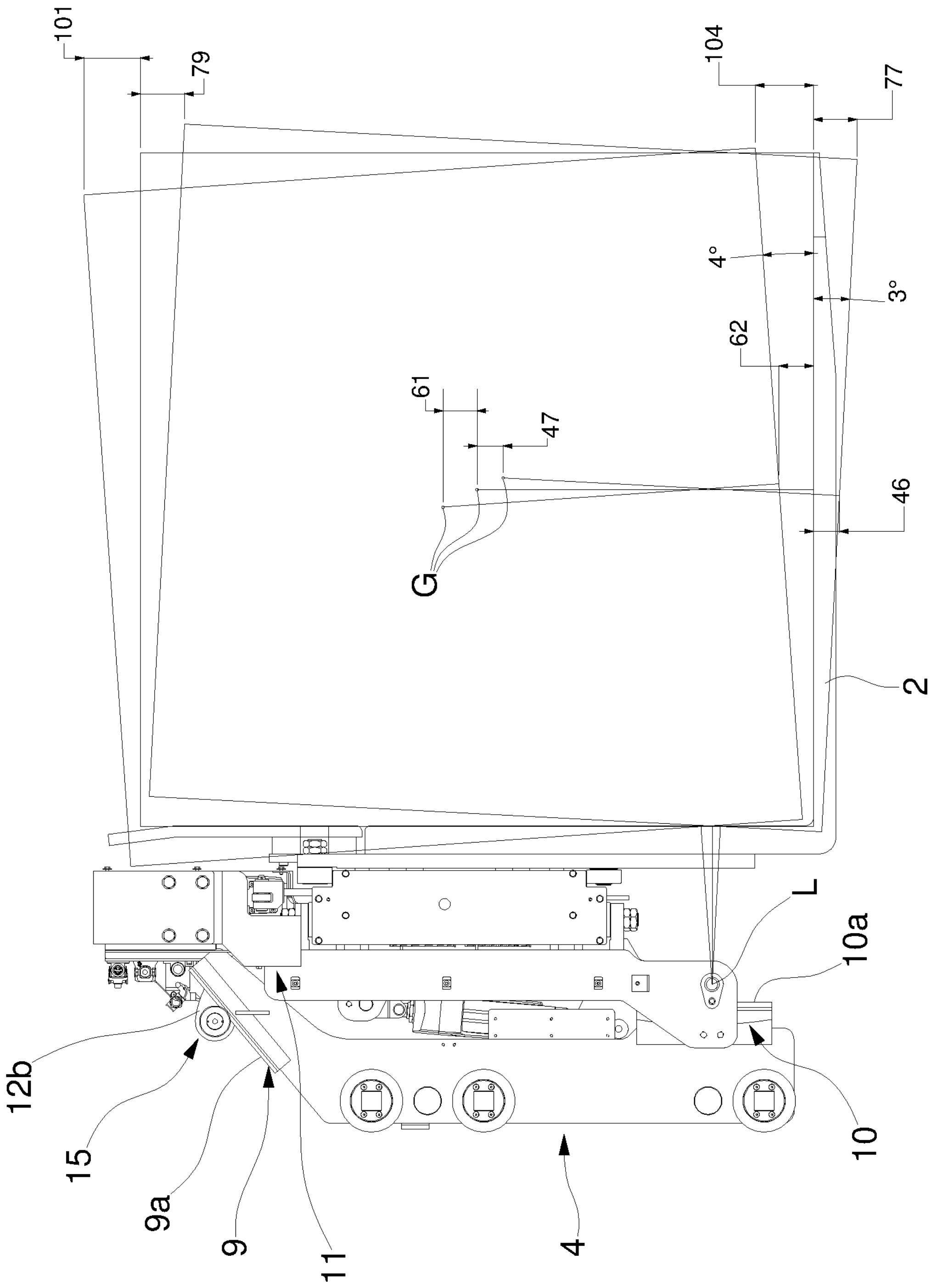
FIG. 1 is a top axonometric view of a first embodiment of an apparatus for operating the fork holder supports according to the present invention.

With reference to FIGS. 1 to 4, an embodiment of the apparatus for operating the fork holder supports is illustrated, according to the present invention, which is indicated overall with 1.

The apparatus 1 carries two forks 2, each provided with a respective upper portion 3 (or backrest) which serves as a rear abutment for the load; the upper portion 3 can be substituted in case of damage.

The apparatus 1 comprises a first frame 4.

The first frame 4 comprises two shoulders 5 which are inserted and can slide, according to known modes, by means of the wheels 6, or other similar means, in a vertical upright (not illustrated) of a forklift, manually or automatically driven.

The first frame 4 comprises fastening to which the lifting member is applied (not visible in the figures) of the apparatus 1; also such member is not illustrated in detail, since it is not part of the present invention.

The shoulders 5 of the first frame 4 are connected to each other by a plate, omitted in the figures for the sake of clarity; the aforesaid plate has a first fastening 7 for first electric actuator means 8.

The aforesaid first electric actuator means 8 comprise a linear electric actuator.

The first frame 4 also comprises connection means 15 for a second frame 11.

The connection means 15 connect the second frame 11 to the first frame 4 so as to allow a rotation between the two frames 4 and 11.

Generally, between the first frame 4 and the second frame 11, a certain rotation is necessary, with respect to an intermediate position at 0°, so as to obtain a corresponding tilt of the forks 2.

In some cases, for example for counter-balanced forklifts which work outside, such rotation is +7°/−4° with respect to the intermediate position; in other cases, for example internal warehouses, the rotation is usually +4°/−3° with respect to the intermediate position.

In the embodiment of FIGS. 1-4, the connection means 15 comprise upper guiding means 9 and lower guiding means 10, arranged on the first frame 4.

Figure 2:
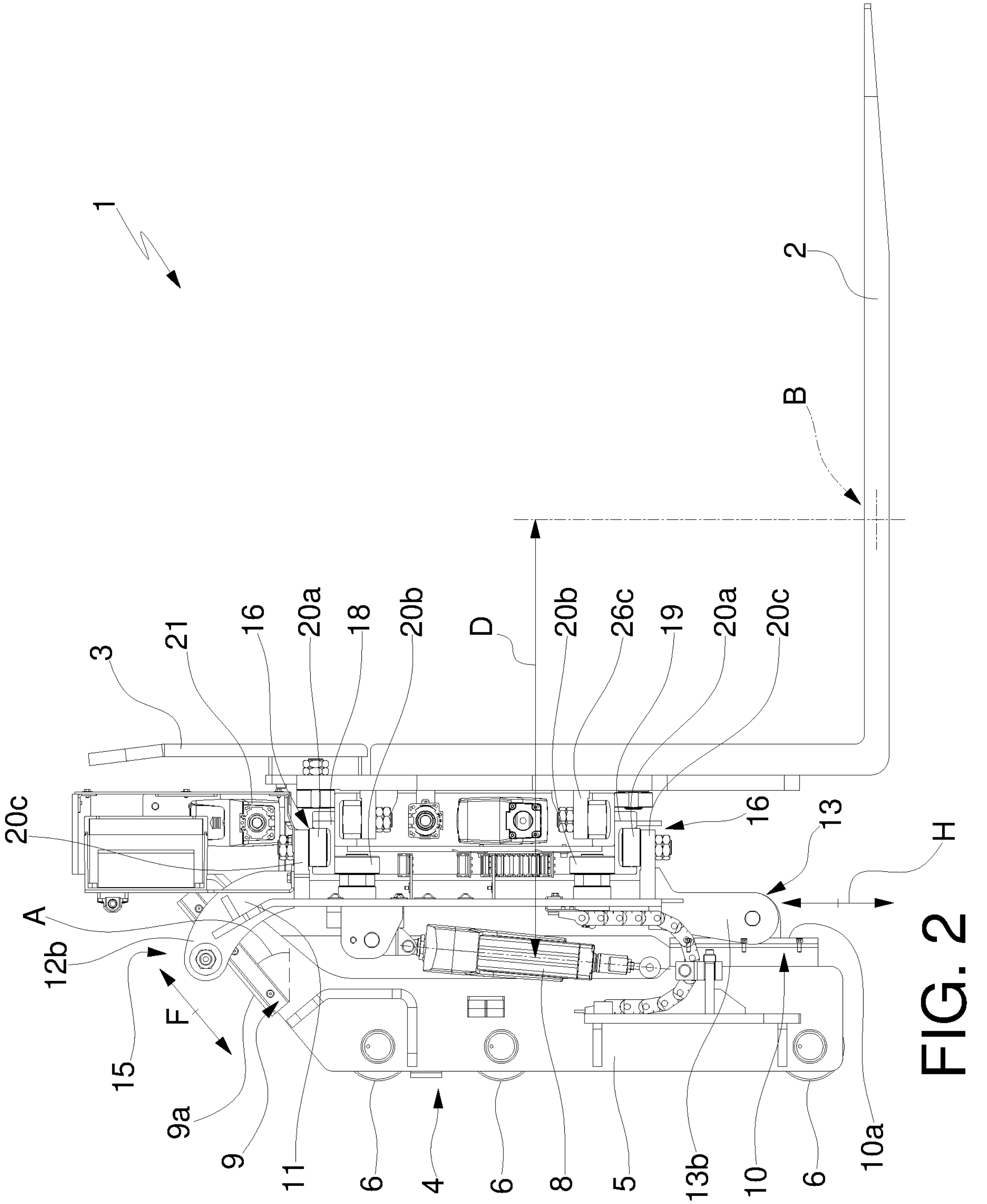
FIG. 2 is a side view of the apparatus for operating the fork holder supports of FIG. 1, with some parts removed for better clarity.

The connection means 15 also comprise upper sliding means 12, slidable according to the direction F (FIG. 2), and lower sliding means 13, slidable according to the direction H (FIG. 2).

In particular, the upper sliding means 12 and the lower sliding means 13 are arranged on the second frame 11.

The upper guiding means 9 are arranged in the upper part of the shoulders 5 of the frame 4, and are tilted upward, in the direction of the front part where the forks 2 are found; the aforesaid upper guiding means 9 have a predetermined tilt angle A.

With respect to a horizontal plane, the angle A can be comprised between 20° and 60°. According to one version of the present invention, the angle A can be about 40°.

The tilt angle A can be varied as a function of the movement geometry, of the second frame 11 with respect to the first frame 4, that one wishes to obtain.

The upper guiding means 9 can comprise two, or more, rectilinear upper rails 9*a* or the like, fixed to the upper portions of the shoulders 5 of the first frame 4, and provided with respective longitudinal ribs in relief.

The upper sliding means 12 can comprise, consequently, two or more upper wheels 12*a*, provided with respective circumferential grooves in which the ribs of the upper rails 9*a* are engaged.

More in detail, the upper wheels 12*a* are rotatably supported in respective upper appendages 12*b* of the second frame 11.

The lower guiding means 10 are arranged in the lower part of the frame 4, on the shoulders 5, towards the front part where the forks 2 are situated.

The lower guiding means 10 are substantially vertical; for example, the lower guiding means 10 have a tilt comprised between +30° and −30° with respect to the vertical.

Also for the lower guiding means 10, different angles can be provided, always close to the vertical, in relation to the movement that one wishes to obtain.

The lower guiding means 10 can comprise two or more rectilinear lower rails 10*a*, or the like, fixed to the lower portions of the shoulders 5 of the first frame 4, and provided with respective longitudinal ribs in relief.

The lower sliding means 13 can comprise, consequently, two or more lower wheels 13*a*, provided with respective circumferential grooves in which the ribs of the lower rails 10*a* are engaged.

More in detail, the lower wheels 13*a* are rotatably supported in respective lower appendages 13*b* of the second frame 11.

As stated, the second frame 11 rests on the upper and lower guiding means 9, 10 of the first frame 4, by means of the corresponding upper sliding means 12 and lower sliding means 13.

The geometric arrangement of the aforesaid guiding means 9, 10 and sliding means 12, 13 allows obtaining a certain rotation of the second frame 11 with respect to the first frame 4 (e.g. +7/−4°, or +4°/−3°, but other values are also possible, which depend on the specific application), considering the two end positions; consequently, one obtains a corresponding tilt of the plane of the forks 2 with respect to a horizontal plane.

The rotation of the second frame 11, with respect to the first frame 4, is due to the movement of the sliding means 12 and 13 on the guiding means 9 and 10; due to the particular geometric arrangement of the aforesaid guiding means 9,10 and sliding means 12,13 described above, the rotation axis B of the second frame 11, with respect to the first frame 4, is virtual, and is found in a position (FIG. 2), which is more advanced with respect to the known solutions, i.e. beyond the plane of the vertical part of the forks 2, and hence substantially at the horizontal portion of the forks 2.

The second frame 11 also comprises a second fastening 14 for the first linear electric actuator 8.

The aforesaid first linear electric actuator 8 can be a linear electric actuator of commercial type.

For example, the first linear electric actuator 8 can be similar to that illustrated in the U.S. Pat. No. 6,101,889A; for size reasons, it develops a more limited force with respect to a corresponding oil-hydraulic actuator.

Alternatively, such actuator 8 can be of the type with trapezoidal screw, or it can be a screw actuator with recirculating ball nut.

Figure 3:
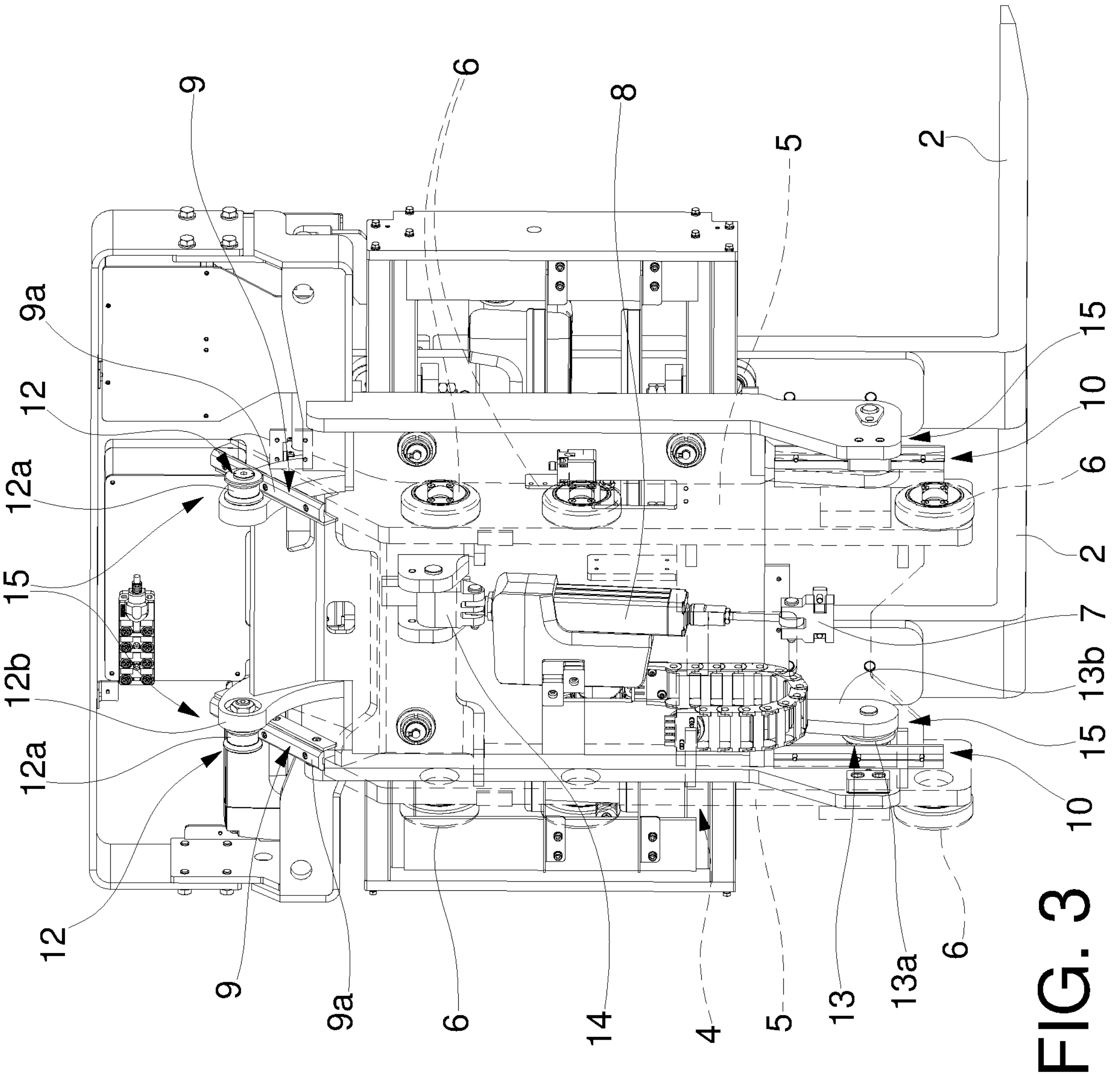
FIG. 3 is a perspective rear view of the apparatus for operating the fork holder supports pursuant to the preceding figures, with some parts removed in order to better illustrate others.
Figure 4:
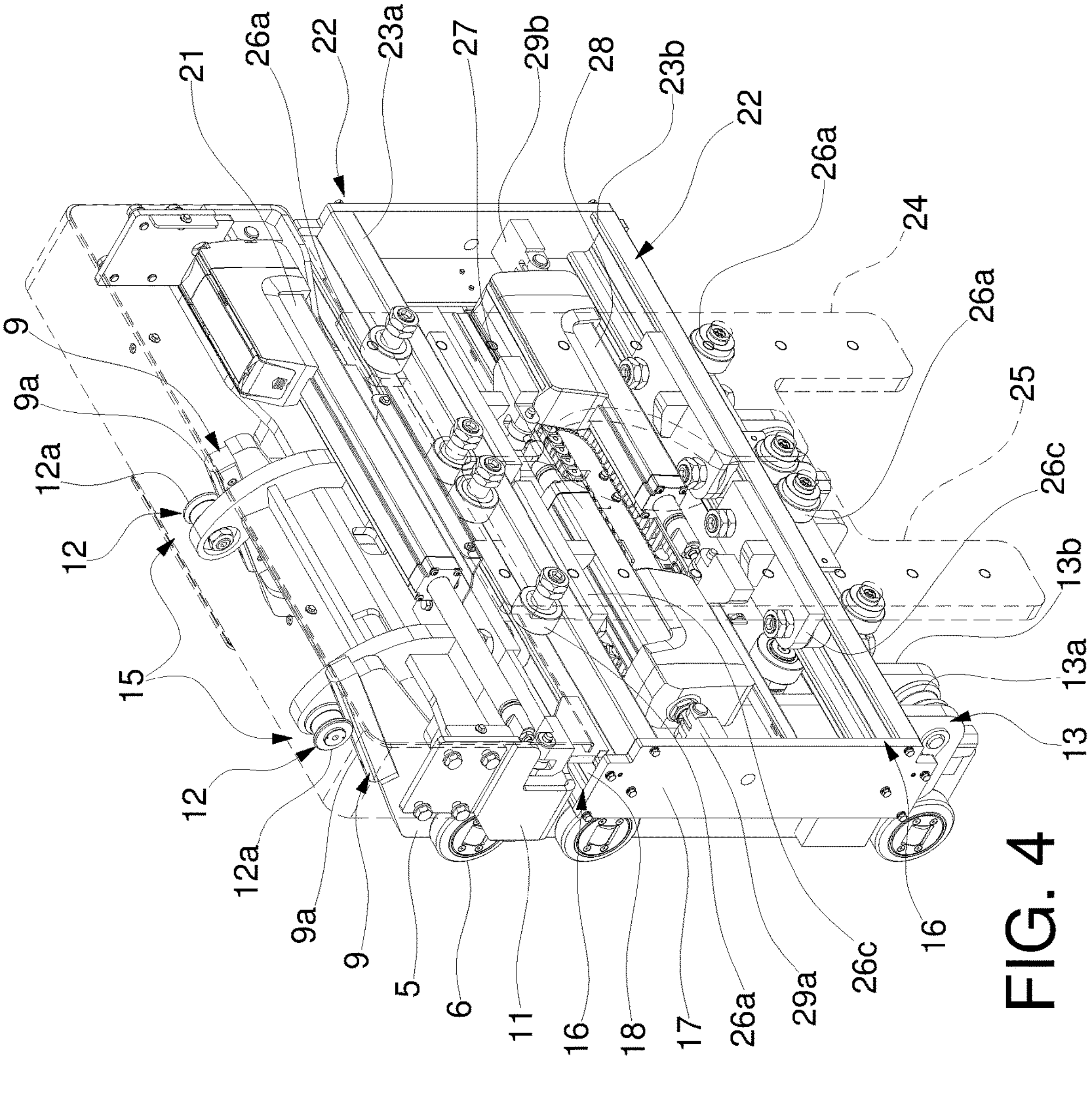
FIG. 4 is a further detailed top axonometric view of the apparatus for operating the fork holder supports pursuant to the preceding figures, with some parts removed in order to better illustrate others.

As can be observed in FIGS. 2 and 3, the first actuator 8 is installed in a nearly vertical position; its size in the apparatus 1, especially in transverse sense, is consequently quite limited.

In practical operation, the first actuator 8 pushes or pulls the second fastening 14, thus moving the upper part of the second frame 11 according to the arrow F (in the two senses, FIG. 2), and the lower part according to the arrow H (in the two senses, FIG. 2); in this manner, a rotation of the second frame 11 is determined with respect to the first frame 4, around the rotation axis B.

The second frame 11 comprises a second guiding means 16 which support a third frame 17, which can be horizontally translated with respect to the second frame 11.

The second guiding means 16 comprise a first upper horizontal guide 18, and a first lower horizontal guide 19.

The second guiding means 16 also comprise first rollers 20*a* and second rollers 20*b*, which slidable support the third frame 17, allowing the aforesaid frame 17 to be moved to the right and left with respect to the second frame 11.

In one version of the present invention, the first upper 18 and lower 19 guides are of prismatic type, and have substantially C-shaped cross section; in use, the first upper 18 and lower 19 guides define the respective longitudinal grooves which are directed upward and downward.

The first rollers 20*a* are rotatably supported by respective opposite first plates 20*c* fixed to the first frame 11, have the respective rotation axes parallel to each other and they are mounted in a mirrored manner.

The first rollers 20*a* are slidable within the longitudinal grooves of the first upper guide 18 and of the first lower guide 19.

The second rollers 20*b* are rotatably supported by the first frame 11 in a manner such that the plane in which their rotation axes lie is perpendicular to the plane in which the rotation axes of the first rollers 20*a* lie.

The second rollers 20*b* are engaged in rolling along the opposite flat internal faces of the first upper guide 18 and of the first lower guide 19.

Due to the possibility to adjust the position of the first rollers 20*a* and of the second rollers 20*b*, it is possible to nearly completely cancel the clearances between rollers 20*a*, 20*b* and guides 18,19, and consequently also the third frame 17 can slide horizontally nearly without clearances with respect to the second frame 11.

The second frame 11 comprises a second linear electric actuator 21 for the movement in horizontal sense of the third frame 17, along the second guiding means 16.

Also the second linear electric actuator 21 can be of commercial type, for example of the same type as the first actuator 8.

It can be suitably selected from among the actuators available on the market, in relation to the force to be exerted and to the travel to be executed in order to obtain the translation of the third frame 17 with respect to the second frame 11.

The second linear electric actuator 21 comprises one end articulated to a lateral side of the second frame 11, and a second end articulated to an upper portion of the third frame 17.

The third frame 17 comprises adjustment means 22 for adjusting the mutual distance between the forks 2.

The adjustment means 22 comprise a second upper horizontal guide 23*a*, and a second lower horizontal guide 23*b*, fixed to the second frame 17.

The second upper guide 23*a* and the second lower guide 23*b* are also of prismatic type, with substantially C-shaped cross section, and define respective mutually facing longitudinal grooves.

The adjustment means 22 also comprise a first support 24 and a second support 25, to which the two forks 2 are respectively fixed.

The adjustment means 22 also comprise third rollers 26*a* and fourth rollers 26*b*, rotatably supported by the first support 24 and by the second support 25.

The first support 24 and the second support 25 are shaped substantially as plates, and in use lie on a same plane.

The third rollers 26*a* are rotatably supported, by the first support 24 and by the second support 25, with the respective rotation axes orthogonal to the plane of the first support 24 and of the second support 25.

The fourth rollers 26*b* are rotatably supported by second plates 26*c*, which are extended from the first support 24 and from the second support 25, perpendicular to the planes of the latter.

The rotation axes of the fourth rollers 26*b* lie on a plane which is perpendicular to the planes in which the rotation axes of the third rollers 26*a* lie.

The third rollers 26*a* are slidable within the longitudinal grooves of the second upper guide 23*a* and of the second lower guide 23*b*.

The fourth rollers 26*b* are engaged in rolling along the flat external faces of the second upper guide 23*a* and of the second lower guide 23*b*.

Also in this case, due to the possibility to adjust the position of the rollers 26*a*, 26*b* with respect to the guides 23*a*. 23*b*, the clearances between rollers and guides can be nearly completely canceled, and consequently also the two supports 24, 25 can slide horizontally nearly without clearances with respect to the third frame 17.

The first support 24 and the second support 25 are respectively actuated by a third actuator 27 and by a fourth actuator 28, in a manner such to be able to vary the mutual distance between the forks 2.

Also the third actuator 27 and the fourth actuator 28 are linear electric actuators of commercial type, for example of the same type as the first actuator 8 and as the second actuator 21.

The third actuator 27 and the fourth actuator 28 are suitably selected from among those available on the market, in relation to the force to be exerted and to the travel to be executed, in order to obtain the desired movements.

The third actuator 27 has one end articulated to a first bracket 29*a* fixed to one of the sides of the third frame 17, and the other end articulated to the first support 24.

Likewise, the fourth actuator 28 has one end articulated to a second bracket 29*b* fixed to the other of the sides of the third frame 17, and the other end articulated to the second support 25.

The third actuator 27 and the fourth actuator 28 can be installed in a manner so to have the respective actuation senses opposite, such that, for example, a command of extension of the actuators causes a mutual moving away of the forks 2; in an opposite manner, the command of return of the actuators causes a mutual approaching of the forks 2.

Figure 5:
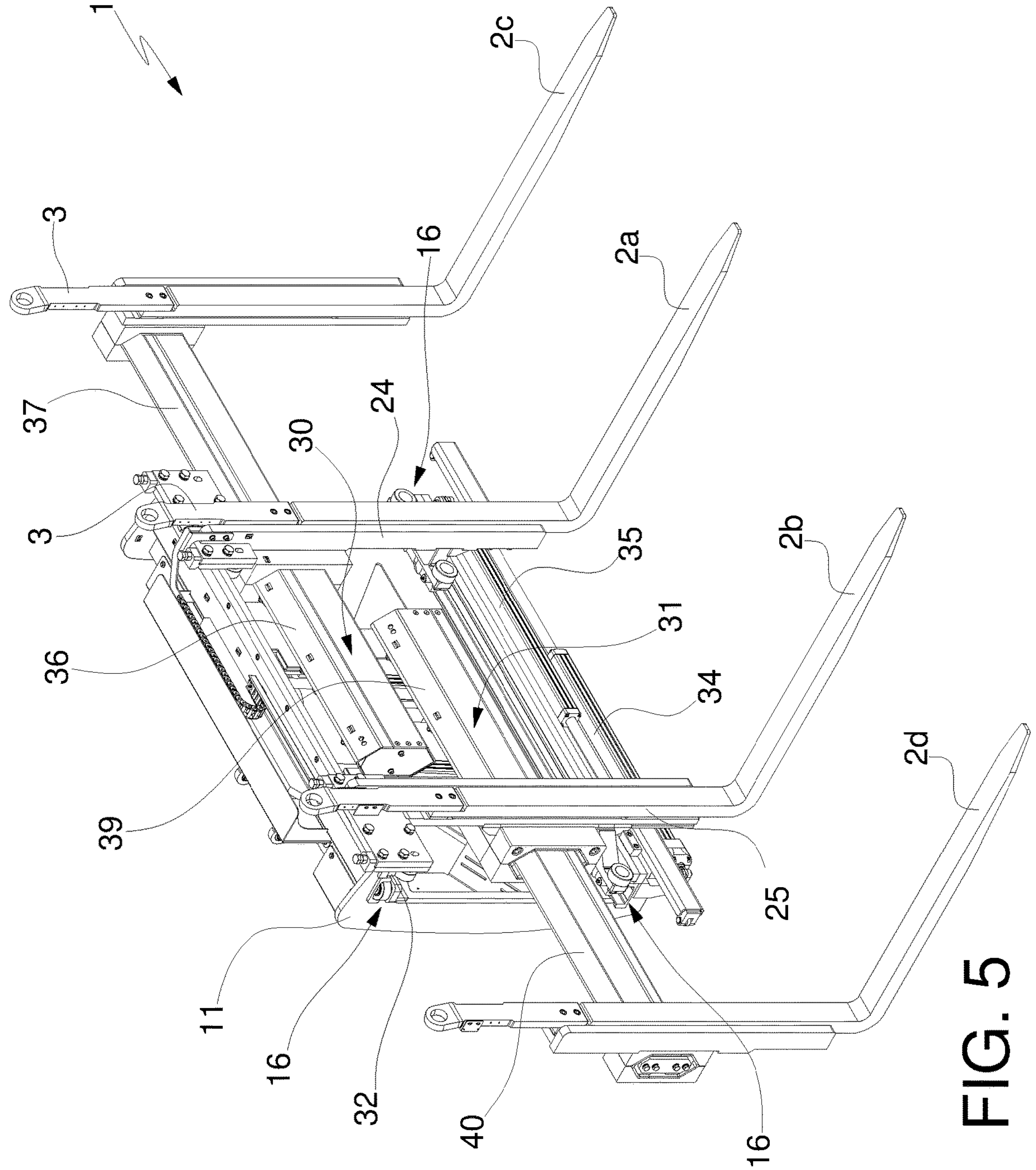
FIG. 5 is a top perspective view of a second embodiment of an apparatus for operating the fork holder supports, according to the present invention.
Figure 6:
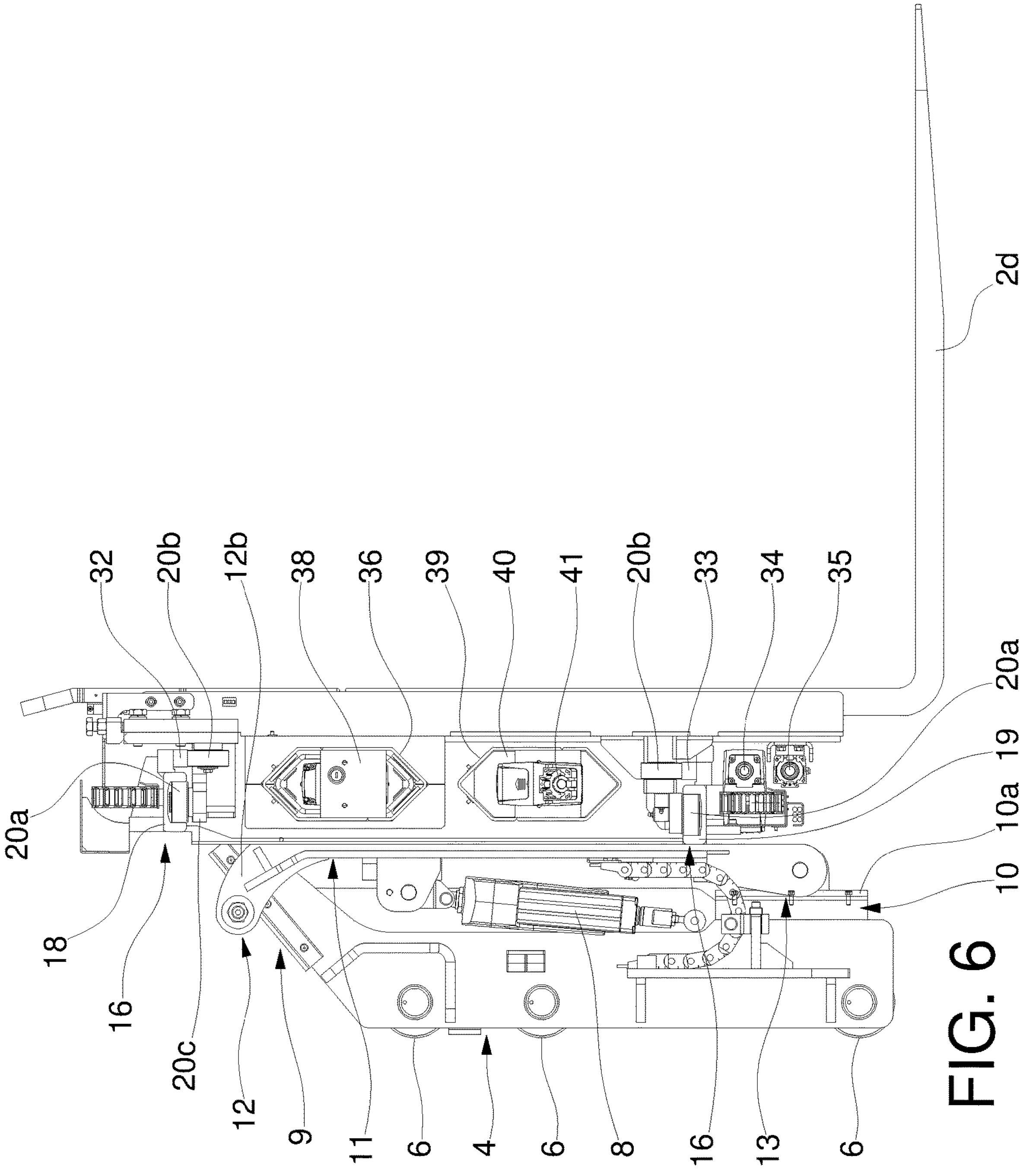
FIG. 6 is a side view of the apparatus according to the embodiment of FIG. 5.

In FIGS. 5,6, a second embodiment is illustrated of the apparatus for operating the fork holder supports, according to the present invention.

This version of the present invention differs from the preceding in that it comprises four fork holder supports for four forks 2*a*, 2*b*, 2*c*, 2*d* in a manner such to be able to treat two pallets at the same time, and thus increasing the productivity.

In the description of this further embodiment, the parts that are equal or similar to the preceding embodiment maintain the same reference numbers.

The four forks 2*a*, 2*b*, 2*c*, 2*d* can also be set close to each other two-by-two, for example for manipulating only one pallet.

In this version of the invention, the second frame 11 comprises second guiding means 16, which slidably support the first support 24 and the second support 25.

The first support 24 and the second support 25 are respectively directly fixed to the central forks 2*a*, 2*b*.

The second frame 11 also comprises first telescopic supporting means 30 and second telescopic supporting means 31, respectively, for the two lateral forks 2*c*, 2*d*.

In other words, the first telescopic supporting means 30 connect, in a slidably adjustable manner, the first central fork 2*a* to the first lateral fork 2*c*, while the second telescopic supporting means 31 connect, in a slidably adjustable manner, the second central fork 2*b* to the second lateral fork 2*d*.

The second guiding means 16 comprise a first upper horizontal guide 18 and a first lower horizontal guide 19.

The second guiding means 16 also comprise first rollers 20*a* and second rollers 20*b*, which slidably support the first support 24 and the second support 25, allowing the latter to be moved to the right and to the left with respect to the second frame 11.

The first upper guide 18 and the first lower guide 19 are of prismatic type, and they have substantially C-shaped cross section; in use, the first upper 18 and lower 19 guides define respective mutually facing longitudinal grooves.

The first rollers 20*a* are rotatably supported by first plates 20*c* integral, respectively, with the first support 24 and the second support 25 and have the respective rotation axes parallel to each other.

The first rollers 20*a* are slidable within the longitudinal grooves of the first upper guide 18 and of the first lower guide 19.

The second rollers 20*b* are rotatably supported, respectively, by the first support 24 and by the second support 25, in a manner such that the plane in which their rotation axes lie is perpendicular to the plane in which the rotation axes of the first rollers 20*a* lie.

The second rollers 20*b* are engaged in rolling along an additional upper guide 32 and an additional lower guide 33, associated respectively with the first upper guide 18 and with the first lower guide 19.

The first support 24 is associated with first actuator means 34, which allow the sliding thereof with respect to the second frame 11 in the desired sense.

Likewise, the second support 25 is associated with second actuator means 35, which allow the sliding thereof with respect to the second frame 11 in the desired sense, i.e. in approaching or in moving away from the first support 24.

The first actuator means 34 comprise, for example, a linear electric actuator having the fixed part connected to the second frame 11, and the movable part connected to the first support 24.

The second actuator means 35 can comprise, likewise, a linear electric actuator having the fixed part connected to the second frame 11, and the movable part connected to the second support 25.

The first actuator means 34 and the second actuator means 35 can be connected to the second frame 11 with opposite actuation senses, in a manner such that a command of extension of the movable part, imparted to both, determines the mutual moving away of the first support 24 and of the second support 25, while a command of return of the movable part, imparted to both, determines a mutual approaching of the first support 24 and of the second support 25.

The first telescopic supporting means 30 comprise a first external element 36, having box-like conformation, fixed to the first support 24, and a first internal element 37, slidable within the first external element 36: the lateral fork 2*c* is connected to the first internal element 37.

The first elements 36,37 are shaped so as to support the load due to the lateral fork 2*c*, and to translate the lateral fork 2*c* with respect to the central fork 2*a*.

Within the first external element 36, slidable guiding means are provided for the first internal element 37.

Such guiding means can comprise, for example, wheels, or the like, rotatably supported within the first external element 36, which can roll on the external surface of the first internal element 37.

The first telescopic supporting means 30 comprise a first actuator member 38, installed within the first external element 36, and connected to the first internal element 37, for operating the translation in one sense or in the other of the latter.

Likewise, the second telescopic supporting means 31 comprise a second external element 39, having box-like conformation, fixed to the second support 25, and a second internal element 40, slidable within the second external element 39: the lateral fork 2*d* is connected to the second internal element 40.

The second elements 39,40 are shaped in a manner so as to support the load due to the lateral fork 2*d*, and to translate the lateral fork 2*d* with respect to the central fork 2*b*. Within the second external element 39, slidable guiding means are provided for the second internal element 40.

Such guiding means can comprise, for example, wheels, or the like, rotatably supported within the second external element 39, which can roll on the external surface of the second internal element 40.

The second telescopic supporting means 31 comprise a second actuator member 41, installed within the second external element 39, and connected to the second internal element 40, for operating the translation in one sense or in the other of the latter.

The first actuator member 38 and/or the second actuator member 41 can be of commercial type, not very bulky, and which allows moving the first, second internal element 37,40 with respect to the first, second external element 36,39.

The first actuator means 34 and the second actuator means 35 can perform both the function of means for adjusting the mutual distance between the two central forks 2*a*, 2*b*, and the function of means of lateral translation of the same central forks 2*a*, 2*b*; for the lateral translation of the central forks 2*a*, 2*b*, the respective first actuator means 34 and second actuator means 35 are both actuated towards the right or towards the left by means of an operative connection mode of master-slave type, while the lateral forks 2*c*, 2*d*, being mechanically connected to the central forks 2*a*, 2*b*, are moved therewith.

Figure 7:
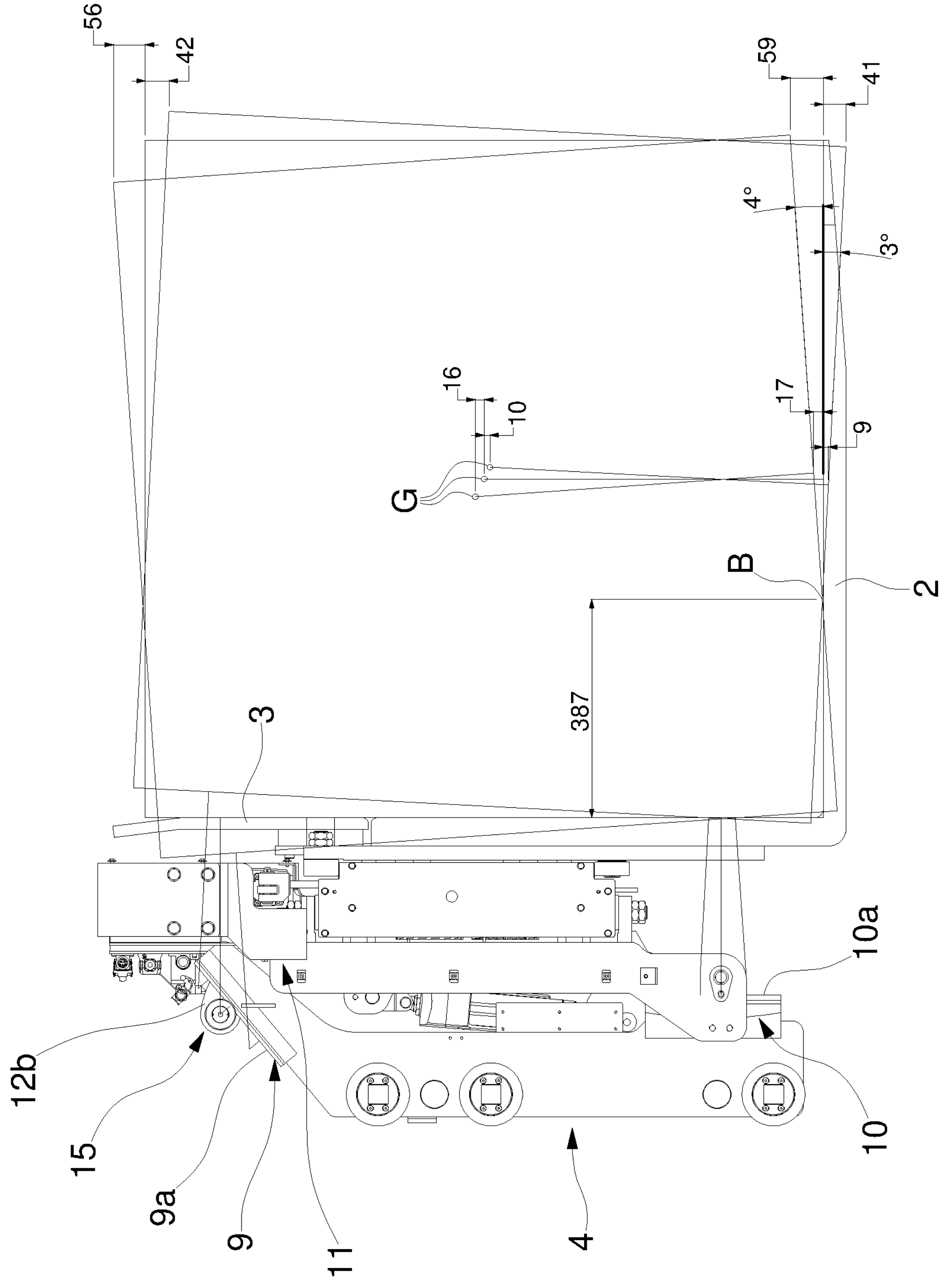
FIG. 7 is a side view of the apparatus according to the embodiments of the preceding figures, with the forks in intermediate position and with the values indicated of the movements of specific points taken as references.

In FIG. 7, the apparatus 1, according to the embodiments of the FIGS. 1-6, is illustrated with the forks 2*a*, 2*b*, 2*c*, 2*d* in intermediate position, and with the values indicated of the movements of specific points taken as references.

In FIG. 7, also the position of the center of gravity G of the load is shown: this is an estimated position, in consideration of the common dimensions of the load, and also in consideration of the fact that the load is normally uniform.

For example, with a load on a pallet, 1200 mm long and 1400 mm high, the position of the center of gravity G is found, in horizontal direction, at 600 mm from the upper abutment portion 3, and in vertical direction, at 700 mm from the horizontal portions of the forks 2*a*, 2*b*, 2*c*, 2*d*.

Figure 8:
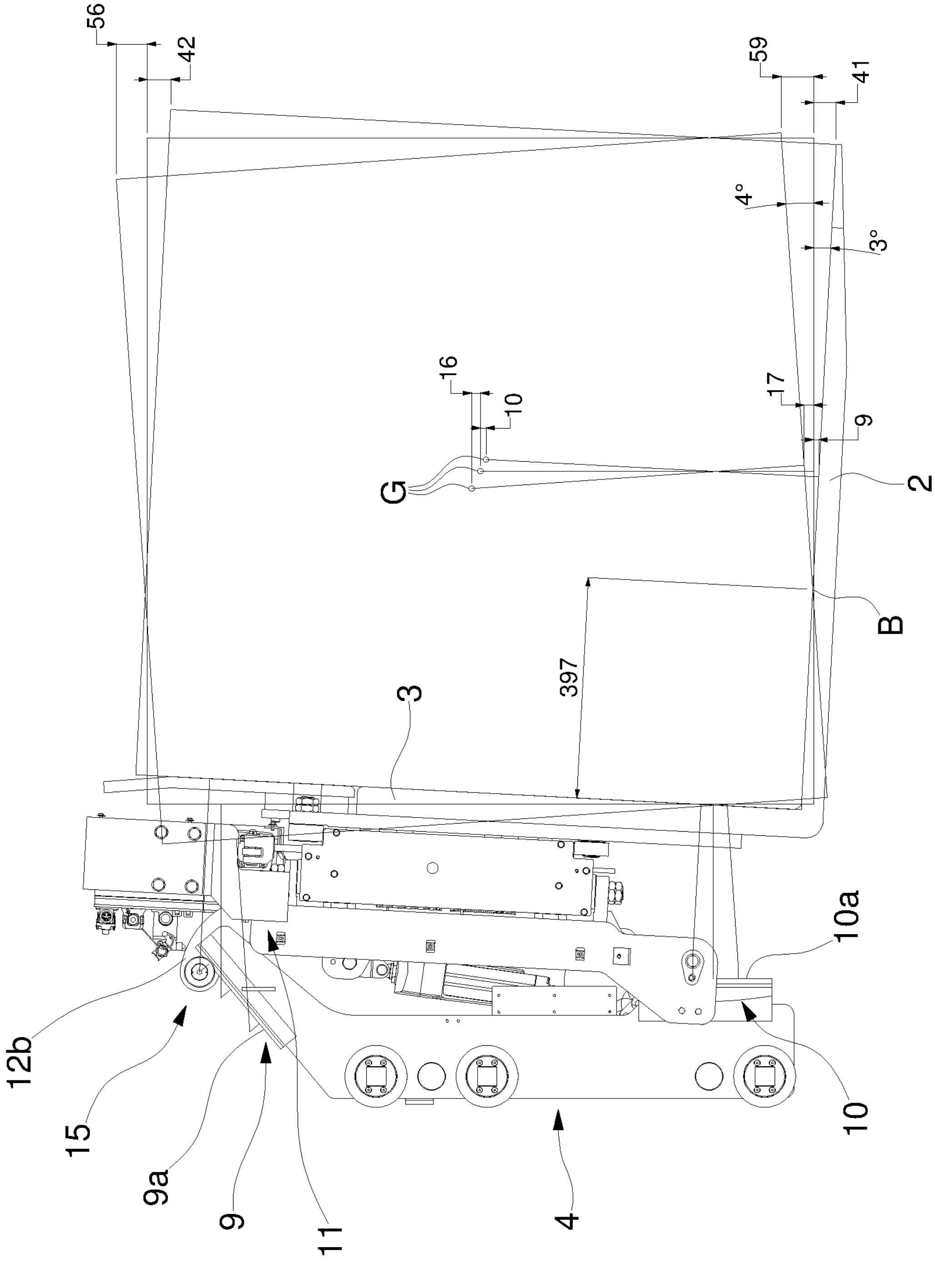
FIG. 8 is a side view of the same apparatus of FIG. 7, with the forks in a downward-tilted position and with the values indicated of the movements of specific points taken as references.

As can be observed, supposing an angular travel of the forks 2*a*, 2*b*, 2*c*, 2*d* of 3° downward (FIG. 8) and of 4° upward (FIG. 9), the rotation axis B is found at a distance, from the upper abutment portion 3, which varies from 376 mm of the upward-tilted position, to 397 mm of the downward-tilted position.

Consequently, the center of gravity G of the load undergoes an overall vertical movement of 26 mm, while the tips of the forks 2*a*, 2*b*, 2*c*, 2*d* undergo an overall vertical movement of 100 mm.

Supposing, therefore, the need to swing with load of 2000 kg, the work which the electric actuator means 8 must carry out is 520 J (20000 N×0.026 m).

Figure 10:
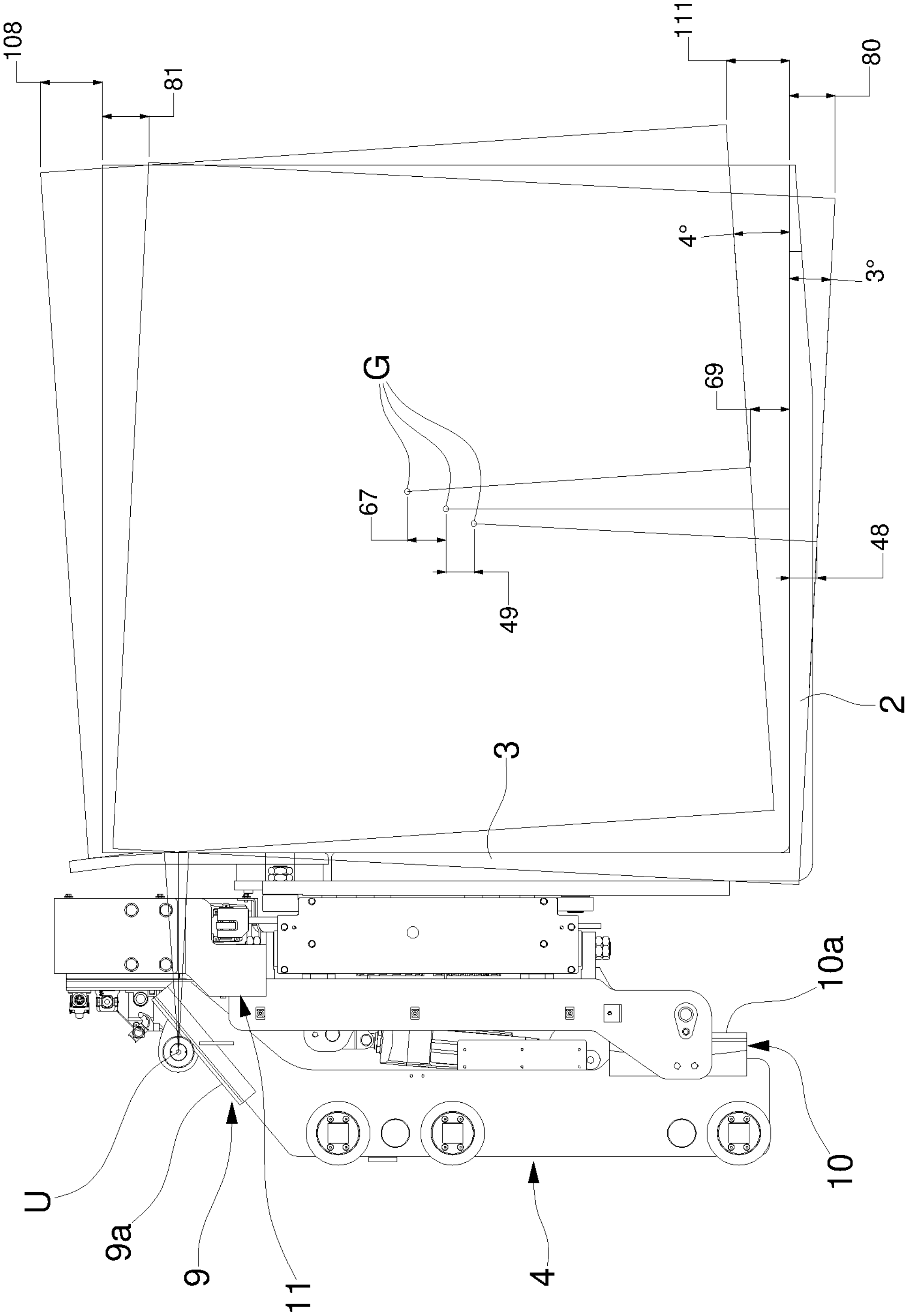
FIG. 10 is a side view of the same apparatus in an operative configuration, corresponding to the prior art, in which the forks are articulated to the first frame at an upper pivot.

In order to carry out a comparison, in FIG. 10 the same apparatus is shown in an operative configuration, corresponding to the prior art, in which the forks 2*a*, 2*b*, 2*c*, 2*d* are articulated to the first frame 4 at an upper pivot U (which, for improved comprehension, is represented coinciding with the rotation axes of the upper wheels 12*a*).

As can be observed, the center of gravity G of the load, in this case, undergoes an overall vertical movement of 116 mm; in addition, the tips of the forks 2*a*, 2*b*, 2*c*, 2*d* undergo an overall vertical movement of 191 mm.

Supposing, therefore, the need once again to swing with load of 2000 kg, the work that the electric actuator means 8 must carry out is 2320 J (20000 N×0.116 mm).

Figure 11:
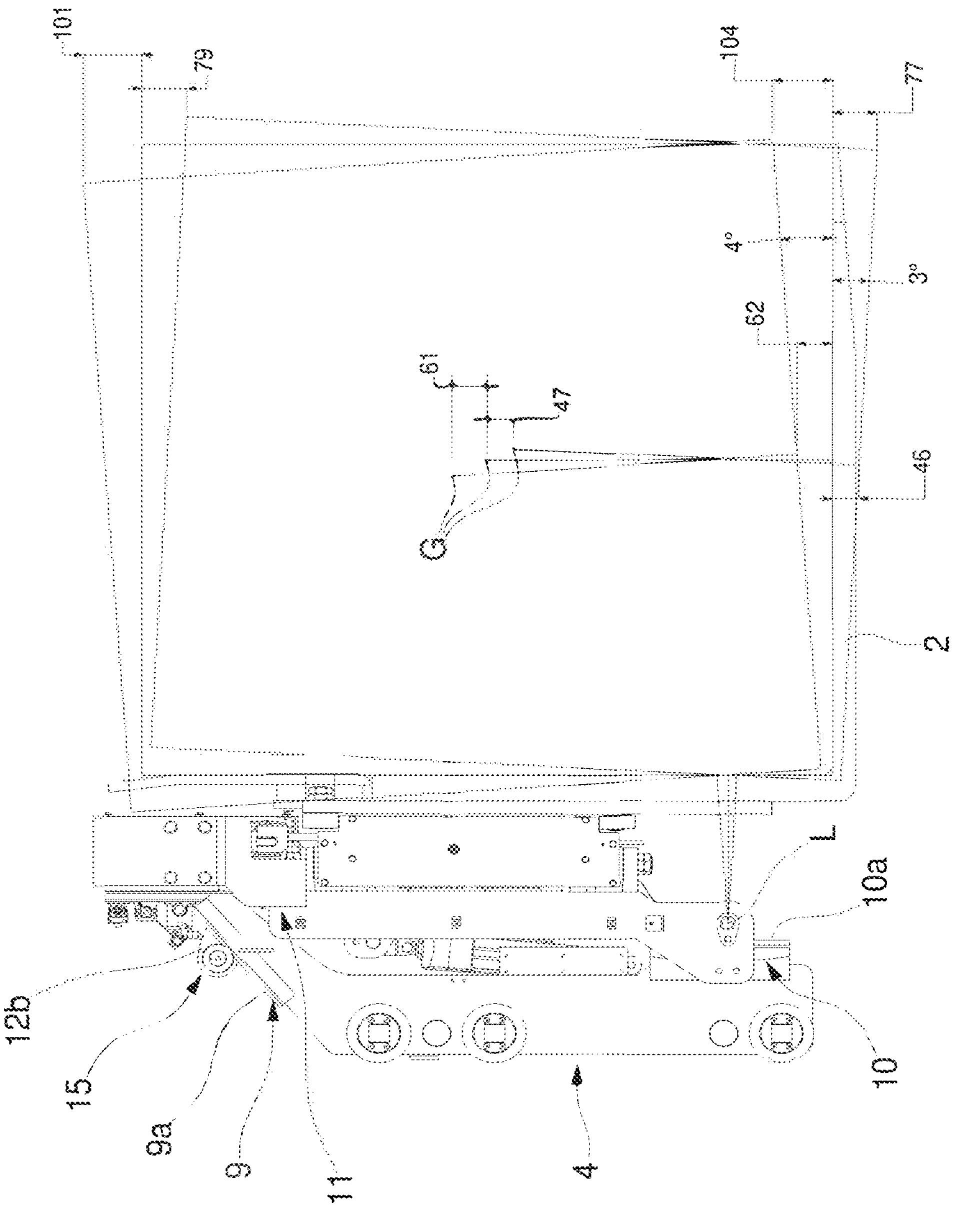
FIG. 11 is a side view of the same apparatus in an operative configuration, corresponding to the prior art, in which the forks are articulated to the first frame at a lower pivot.

Still in order to carry out a comparison, in FIG. 11, the same apparatus is shown in an operative configuration, corresponding to the prior art, in which the forks 2*a*, 2*b*, 2*c*, 2*d* are articulated to the first frame 4 at a lower pivot L (which, for improved comprehension, is represented coinciding with the rotation axes of the lower wheels 13*a*).

As is observed, the center of gravity G of the load, in this case, undergoes an overall vertical movement of 108 mm; in addition, the tips of the forks 2*a*, 2*b*, 2*c*, 2*d* undergo an overall vertical movement of 181 mm.

Supposing the need once again to swing with load of 2000 kg, the work that the electric actuator means 8 must carry out is 2160 J (20000 N×0.108 mm).

It is inferred that the energy required for carrying out the swing of the load with the solution according to the present invention is therefore considerably less than that required in the known solutions with upper or lower pivot (given the same angular travel in the swing), due to the fact that the rotation axis B of the forks 2*a*, 2*b*, 2*c*, 2*d* is found at a smaller distance from the center of gravity G of the load, with respect to the known solutions.

This allows using lower-power electric actuator means 8, hence means also with more limited size.

Another important advantage consists of the fact that the vertical movement of the tips of the forks 2*a*, 2*b*, 2*c*, 2*d* is much more limited with respect to the solutions of known type. This is an advantage of operative type, since the steps of loading and unloading the pallet are facilitated, and in addition it is possible to better exploit the free space available above the pallet during storage.

It must also be added that a more limited movement of the tips of the forks 2*a*, 2*b*, 2*c*, 2*d* improves the perception of the maneuvering space, and hence the confidence of the operator who commands the vehicle during the storage operations, which can therefore be quicker in executing of the operations: indeed, with the solutions of known type, the operator does not normally have a good view of the pallet when it is lifted, due to the high movement of the tips.

Figure 12:
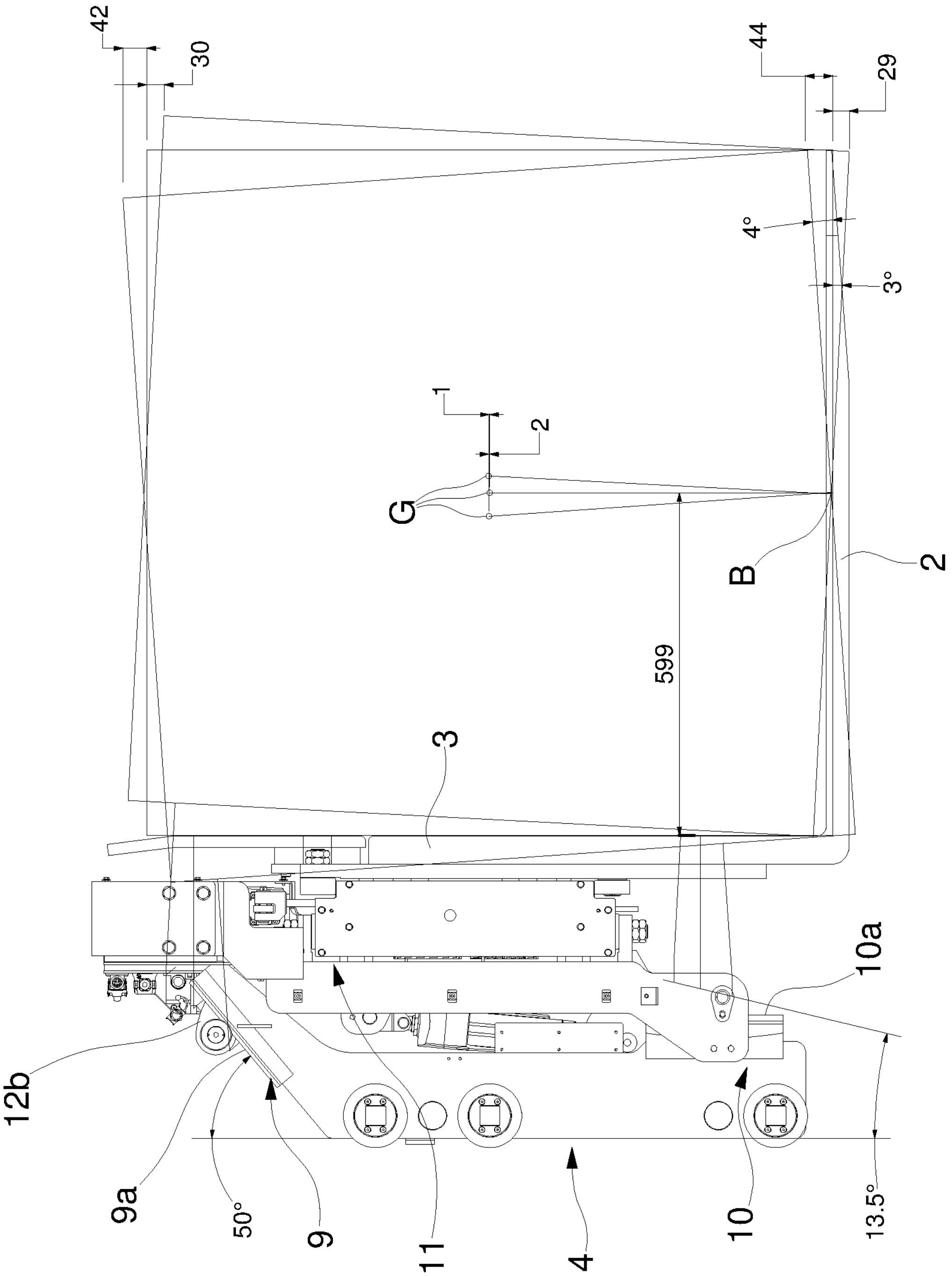
FIG. 12 is a side view of a third embodiment of the apparatus for operating the fork holder supports according to the present invention.
Figure 13:
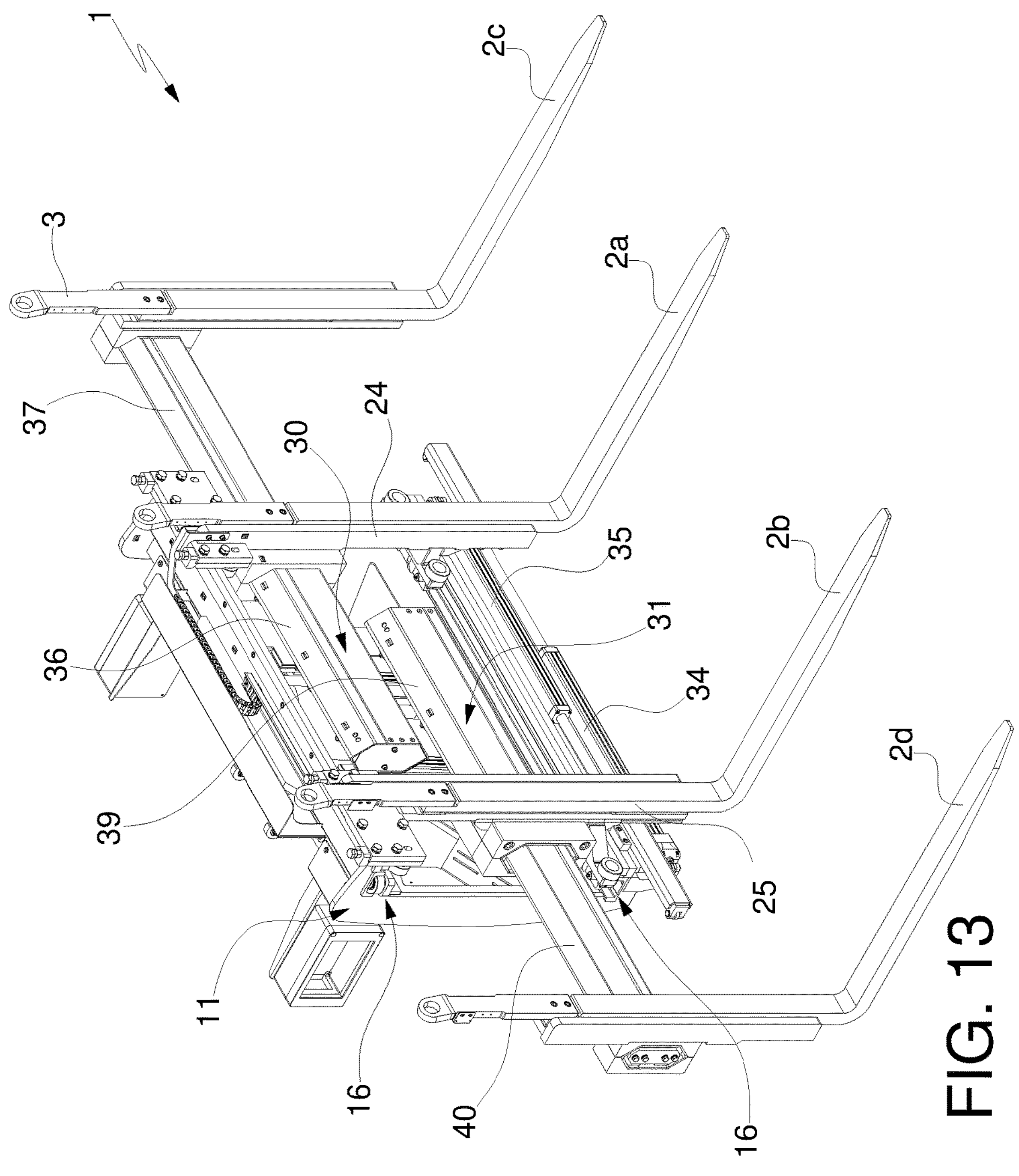
FIG. 13 is a top perspective view of a fourth embodiment of an apparatus for operating the fork holder supports according to the present invention.

In FIG. 12, a third embodiment of the invention is illustrated.

This embodiment differs from the preceding embodiments in that the upper guiding means 9 and/or the lower guiding means 10 are adjustable, in a manner to be able, consequently, to modify the position of the rotation axis B of the forks 2*a*, 2*b*, 2*c*, 2*d*.

In particular, the tilt of the upper rails 9*a* and/or of the lower rails 10*a* can be varied with respect to the fixed tilt provided in the preceding versions of the invention, such that also the position of the rotation axis B of the forks 2*a*, 2*b*, 2*c*, 2*d* can be consequently varied. This modification can be useful for adapting the apparatus 1 to loads of different sizes and characteristics, always with the objective of obtaining a rotation axis B of the forks 2*a*, 2*b*, 2*c*, 2*d* as close as possible to the center of gravity G of the load.

More in detail, in the version shown in FIG. 12, for the sake of simplicity, only the tilt of the lower rails 10*a* is adjustable.

Only by way of a non-limiting example, in the particular configuration of FIG. 12, the tilt of the lower rails 10*a* is 13.5° with respect to the vertical position provided in the preceding embodiments.

As can be observed, in this configuration of the apparatus, the rotation axis B of the forks 2*a*, 2*b*, 2*c*, 2*d* is found, with reference to the horizontal direction, at a distance of about 600 mm from the upper abutment portion 3, and hence is found substantially at the estimated position of the center of gravity G.

The overall vertical movement of the center of gravity G of the load, in this case, is only 3 mm.

It is therefore evident that this solution allows further reducing the energy required for the electric actuator means 8 in order to carry out the swing of the forks 2*a*, 2*b*, 2*c*, 2*d*. According to the invention, therefore, by modifying the tilt of the upper rails 9*a* and/or of the lower rails 10*a*, it is possible to modify the position of the rotation axis B of the forks 2*a*, 2*b*, 2*c*, 2*d* as desired, with the variation of the characteristics of the load, and hence with the variation of the position of its center of gravity G (for example for very short or very long loads).

The tilt of the upper rails 9*a* and/or of the lower rails 10*a* can be varied in many different ways.

For example, such tilt can be varied manually.

Or, in one embodiment of the invention not represented in the figures, the tilt of the upper rails 9*a* and/or of the lower rails 10*a* can be varied by means of respective adjustment actuators, of any type suitable for this specific application.

In FIGS. 13 to 19, a fourth embodiment is illustrated of the apparatus for operating the fork holder supports, according to the present invention.

Also this embodiment of the invention comprises four fork holder supports for four forks 2*a*, 2*b*, 2*c*, 2*d*, in a manner so as to be able to treat two pallets at the same time.

In the description of this further embodiment, the parts that are equal or similar to the preceding embodiment maintain the same reference numbers.

With regard to the characteristics of the four forks 2*a*, 2*b*, 2*c*, 2*d*, and of the possible movements of the latter, the considerations hold true that were set forth in the embodiment of the FIGS. 5,6.

Figure 9:
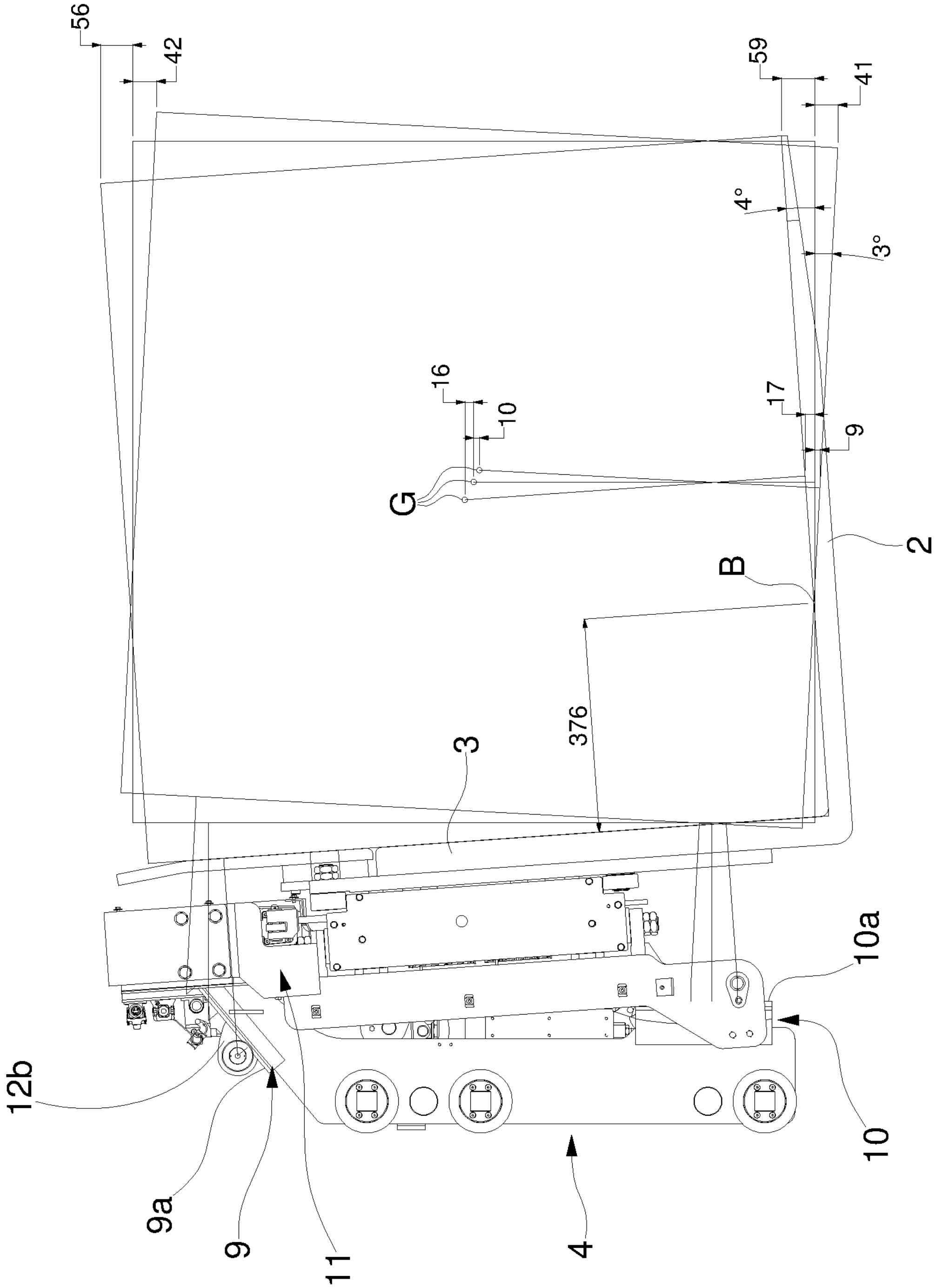
FIG. 9 is a side view of the same apparatus of the FIGS. 7,8, with the forks in an upward-tilted position and with the values indicated of the movements of specific points taken as references.

As shown in FIGS. 9,10, the four forks 2*a*, 2*b*, 2*c*, 2*d* can be set close to each other two-by-two, for example for manipulating only one pallet.

The apparatus 1 is fixed, by means of connection means 15, to a first frame (not illustrated), vertically slidable in an upright of a manually or automatically driven forklift.

In this embodiment, the connection means 15 comprise an upper fastening 42 and a lower fastening 43.

In the upper fastening 42, a cam element 44 is hinged.

The cam element 44 comprises one or two profiles 45.

The lower fastening 43 are instead fixed to the second frame 11, which supports the forks 2*a*, 2*b*, 2*c*, 2*d* in the manner described with regard to the preceding embodiment of the FIGS. 5,6.

More in detail, the profile 45 is constituted by, or comprises, a circular sector, which has a geometric center “C” in a different position with respect to the upper fastening 42, in which the cam element 44 is instead hinged.

Figure 14:
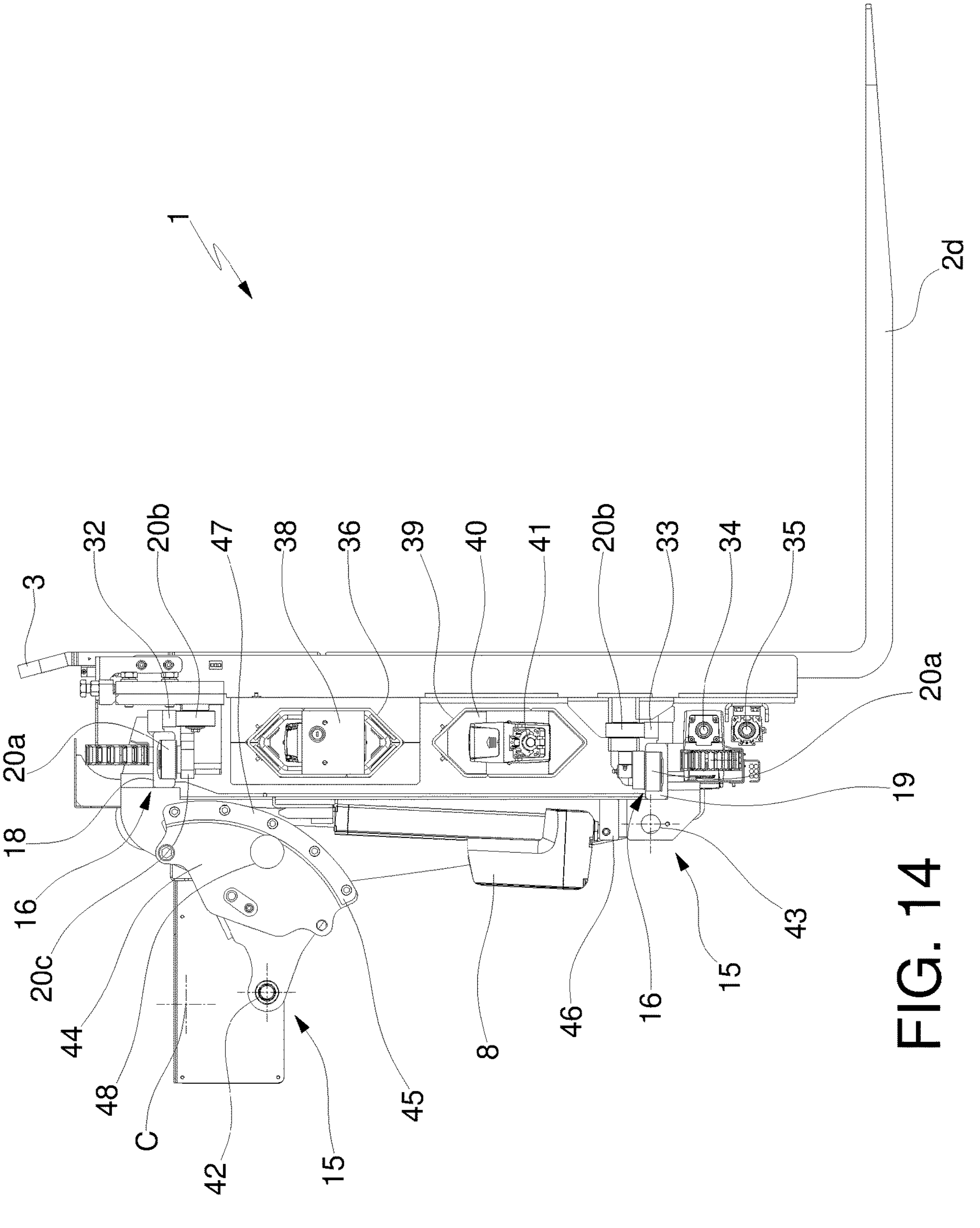
FIG. 14 is a side view of the apparatus for operating the fork holder supports according to the embodiment of FIG. 13.
Figure 15:
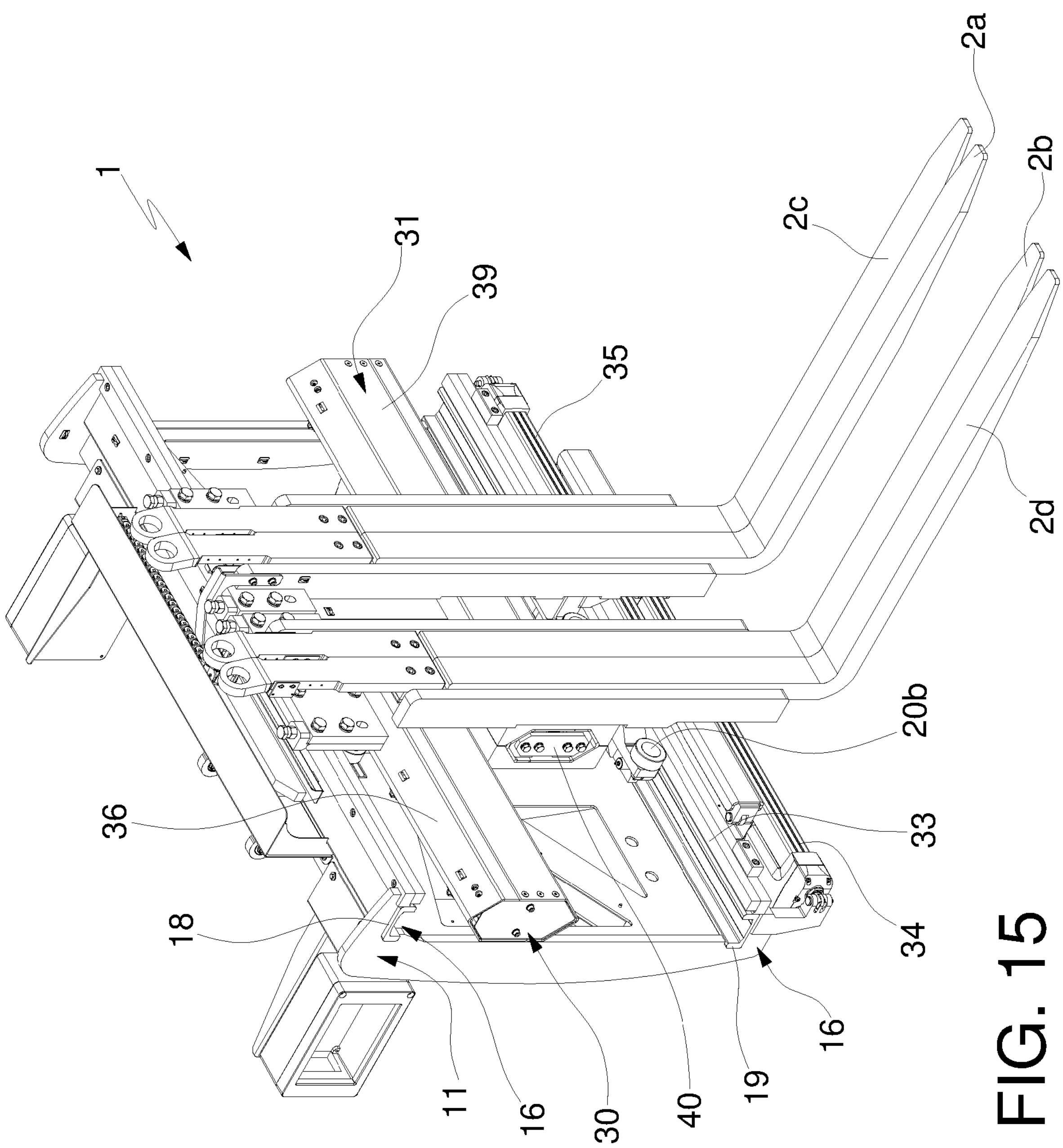
FIG. 15 is a top perspective view of the apparatus for operating the fork holder supports according to the embodiment of FIGS. 13 and 14, in another operative configuration.
Figure 16:
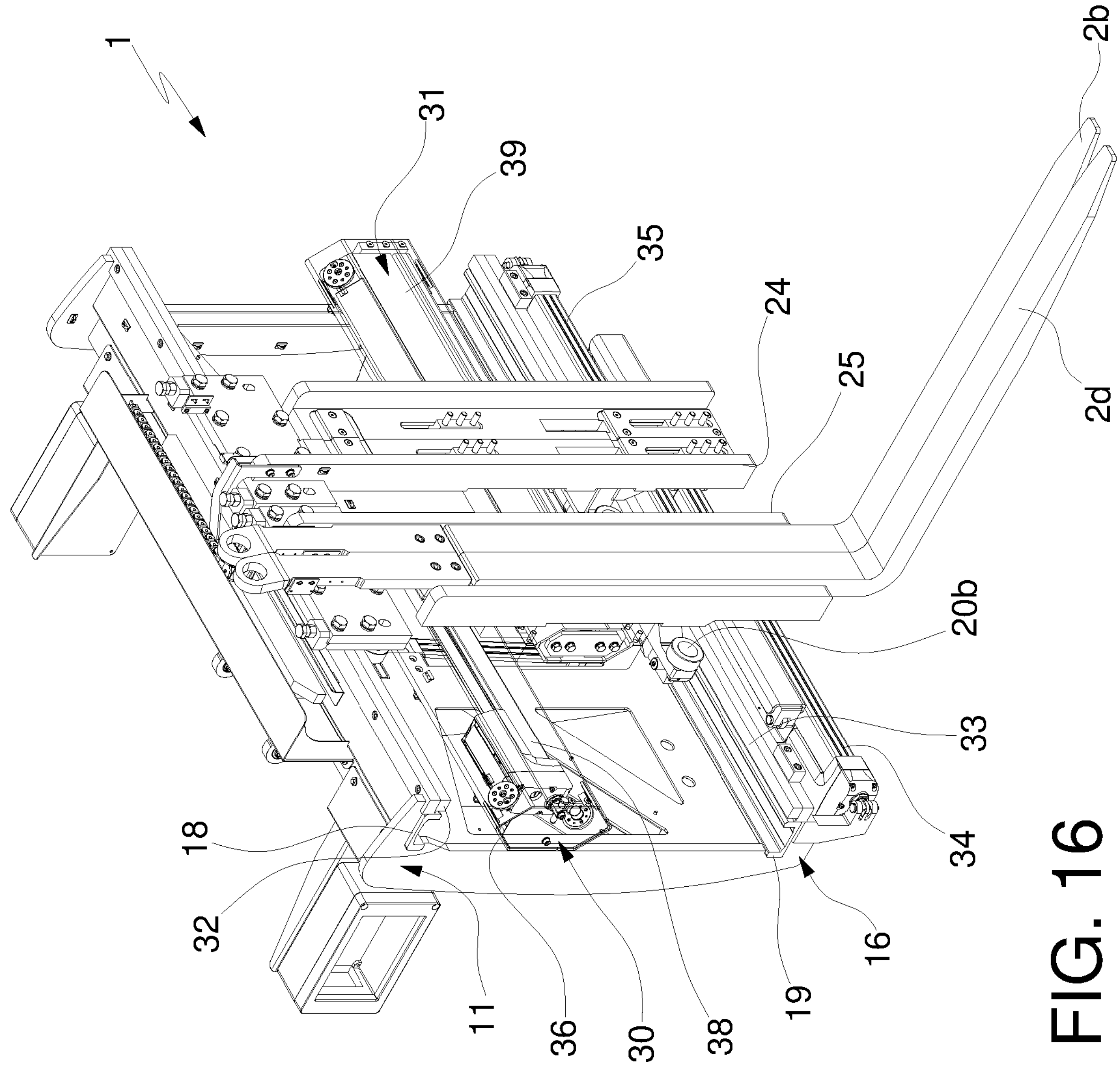
FIG. 16 is a top perspective view of the apparatus for operating the fork holder supports pursuant to the preceding figure, with some parts removed in order to better illustrate others.

In other words, the geometric center “C” is in an eccentric position with respect to the rotation center of the cam element 44, rotation center which is at the upper fastening 42. As shown in FIG. 14, the apparatus 1 comprises first actuator means 8 comprising, in turn, a linear electric actuator.

The linear electric actuator of the first actuator means 8 is arranged, in use, in a nearly vertical position, between lower connection means 46, provided in the second frame 11, and upper connection means 47, which are situated in the cam element 44.

The second frame 11 also rotatably supports a roller 48 (or multiple rollers 48), which rolls (or roll) on the profile 45 (or on the profiles 45) of the cam element 44.

Two first linear electric actuators 8, of commercial type and not very bulky, can also be provided.

Figure 17:
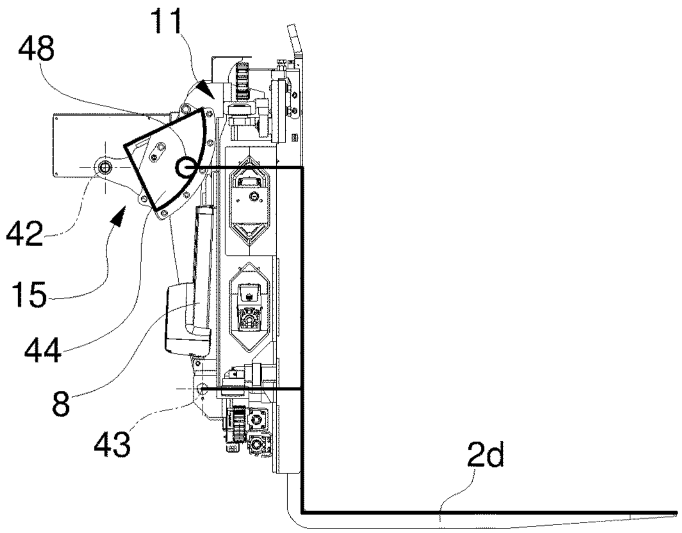
FIGS. 17, 18 and 19 are schematic views of operative configurations of the apparatus for operating the fork holder supports according to the embodiment of FIGS. 13-16.
Figure 18:
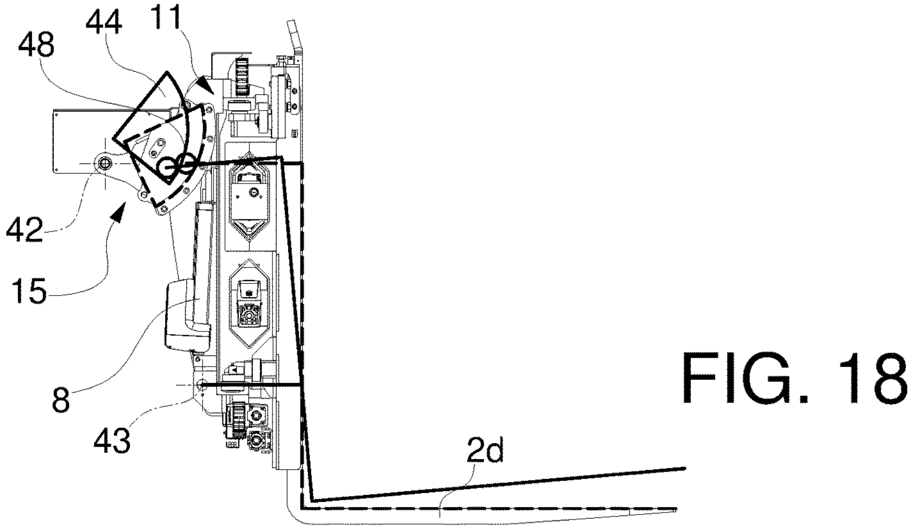
Figure 19:
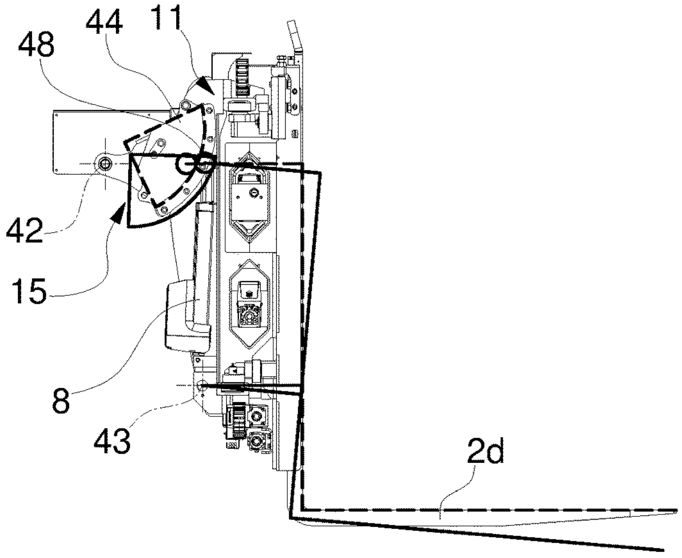

As shown in the schemes of the FIGS. 17-19, the first linear electric actuator 8, by moving the cam element 44, rotating around the upper fastening 42, indirectly determines a rotation of the second frame 11 around the lower fastening 43, and hence a variation of tilt of the forks 2*a*, 2*b*, 2*c*, 2*d*.

The rotation of the cam element 44, due to the actuation of the first linear electric actuator 8, determines a horizontal movement of the roller 48, so that the profile 45 approaches or moves away from the roller 48 itself at the upper fastening 42, which is the rotation center of the circular sector that exemplifies the profile 45; the circular sector, which as stated has center in “C”, is eccentric with respect to the upper fastening 42, and determines the approaching or moving away of the roller 48 with respect to the aforesaid upper fastening 42.

In other words, the rotation of the second frame 11 is, therefore, due to the movement, substantially horizontal, of the roller 48 (or of the rollers 48) which is fixed to the second frame 11, and rolls (or in any case is moved) along the profile 45 of the cam element 44. In the configuration of FIG. 17, the cam element 44 is found in an intermediate position corresponding to the horizontal position of the horizontal part of the forks 2*a*, 2*b*, 2*c*, 2*d*, and also the first linear electric actuator 8 is found in an intermediate position.

In the configuration of FIG. 18, the cam element 44 is found in an upper end position, actuated by the first linear electric actuator 8: such position of the cam element 44 corresponds to the upward-tilted position of the horizontal part of the forks 2*a*, 2*b*, 2*c*, 2*d*, for example such tilted position can be +5° of the horizontal part of the forks 2*a*, 2*b*, 2*c*, 2*d* with respect to a horizontal plane.

In the configuration of FIG. 19, the cam element 44 is found in a lower end position, actuated by the first linear electric actuator 8: such position of the cam element 44 corresponds to the downward-tilted position of the horizontal part of the forks 2*a*, 2*b*, 2*c*, 2*d*, for example such tilted position can be −5° of the horizontal part of the forks 2*a*, 2*b*, 2*c*, 2*d* with respect to a horizontal plane.

The cam element 44 therefore allows multiplying the force developed by the first linear electric actuator 8 so as to attain a tilt of the forks 2*a*, 2*b*, 2*c*, 2*d* also with one or two linear electric actuators, of commercial type that is not very bulky.

It is thus seen that the invention reaches the proposed objects.

In particular, the proposed solutions have systems for actuating the forks with limited size and limited weight, also due to the fact that the particular configurations proposed for the means for connecting the second frame to the first frame allow using actuators which operate with lower forces with respect to the known solutions.

The invention thus conceived is susceptible of numerous modifications and variations, all falling within the scope of the inventive concept.

In addition, all the details can be substituted by other technically equivalent elements. In practice, the materials employed, as well as the contingent shapes and sizes, can be of any type according to the requirements, without departing from the protective scope of the following claims

The invention claimed is:

1. An apparatus comprising:

a fork holder support of forks of a manually or automatically driven forklift, a first frame slidable within a vertical upright of said forklift, said first frame comprising a connector for a second frame, wherein said second frame supports said connector, wherein said connector is configured to allow a rotation of said second frame with respect to said first frame, and a first actuator to rotate said second frame with respect to said first frame around an axis of rotation (B), said connector comprising guiding means and sliding means, and wherein said first actuator comprises at least one linear electric actuator, wherein said sliding means comprise upper sliding means and lower sliding means, wherein said upper sliding means comprise at least two upper wheels and wherein said lower sliding means comprise at least two lower wheels;

wherein said guiding means comprise upper guiding means and lower guiding means on which said upper sliding means and lower sliding means, respectively, slide, said upper guiding means comprising at least two upper rails having, in use, a tilt angle (A), with respect to a horizontal plane, between 20° and 60°, and said lower guiding means comprising at least two lower rails arranged in a lower part of said first frame, and, in use, being substantially vertically arranged, wherein said guiding means and said sliding means are configured so that a rotation axis (B) of said second frame with respect to said first frame lies beyond a plane of the vertical part of said forks, and, therefore, substantially at a horizontal portion of said forks, and further comprising a first fastening of the at least one linear electric actuator on the said first frame, and a second fastening of said at least one linear electric actuator on said second frame.

2. The apparatus according to claim 1, wherein said lower guiding means have, in use, a tilt between +30° and −30° with respect to the vertical axis.

3. The apparatus according to claim 1, wherein said upper guiding means and/or said lower guiding means are adjustable, so as to consequently modify the position of said rotation axis (B) of said forks.

4. The apparatus according to claim 1, wherein said second frame comprises second guiding means which support a third frame, which can be horizontally translated with respect to said second frame.

5. The apparatus according to claim 4, wherein said third frame comprises adjustment means for adjusting the mutual distance between said forks, said adjustment means comprising a first support and a second support to which the two forks are respectively fixed.

6. The apparatus according to claim 5, comprising four fork holder supports for four forks, wherein the central forks are respectively fixed to said first support and to said second support.

7. The apparatus according to claim 6, wherein said second frame comprises first telescopic supporting means and second telescopic supporting means, respectively, for the two side forks, said first telescopic supporting means being configured to connect, in a slidingly adjustable manner, the first central fork to the first side fork, said second telescopic supporting means being configured to connect, in a slidingly adjustable manner, the second central fork to the second side fork.

8. The apparatus according to claim 7, wherein said first telescopic supporting means comprise a first external element, having a box-shaped conformation, fixed to said first support, and a first internal element, which slides inside said first external element, said side fork being connected to said first internal element.

9. The apparatus according to claim 8, wherein said first telescopic supporting means comprise a first actuator member, installed inside said first external element, and connected to said first internal element, to operate the translation in one direction or the other of the latter.

10. The apparatus according to claim 8, wherein said second telescopic supporting means comprise a second external element, having a box-shaped conformation, fixed to said second support, and a second internal element, which slides inside said second external element, said side fork being connected to said second internal element.

11. The apparatus according to claim 10, wherein said second telescopic supporting means comprise a second actuator member, installed inside said second external element, and connected to said second internal element, to operate the translation in one direction or the other of the latter.

* * * * *